*US006108724A*

United States Patent [19]
Din

[11] Patent Number: 6,108,724
[45] Date of Patent: Aug. 22, 2000

[54] FAST IDE DRIVE TO DRIVE TRANSFERS

[75] Inventor: Salah U. Din, Dakota Dunes, S. Dak.

[73] Assignee: Gateway 2000, Inc., North Sioux City, S. Dak.

[21] Appl. No.: 08/864,503

[22] Filed: May 29, 1997

[51] Int. Cl.[7] .................................................. G06F 13/00
[52] U.S. Cl. ................................ 710/52; 710/22; 710/29
[58] Field of Search ..................................... 395/842, 849, 395/872; 710/22, 29, 52

[56] References Cited

U.S. PATENT DOCUMENTS

| | | | |
|---|---|---|---|
| 5,175,825 | 12/1992 | Starr ......................................... | 395/325 |
| 5,175,864 | 12/1992 | Tairaku et al. ........................... | 395/800 |
| 5,193,149 | 3/1993 | Awiszio et al. .......................... | 395/250 |
| 5,249,279 | 9/1993 | Schmenk et al. ........................ | 395/425 |
| 5,398,324 | 3/1995 | Matida et al. ............................ | 395/425 |
| 5,418,925 | 5/1995 | DeMoss et al. .......................... | 395/425 |
| 5,440,716 | 8/1995 | Schultz et al. ........................... | 395/441 |
| 5,535,414 | 7/1996 | Burge ....................................... | 395/827 |
| 5,615,133 | 3/1997 | Gillard et al. ............................ | 364/550 |
| 5,732,279 | 3/1998 | Wood et al. .............................. | 395/821 |

OTHER PUBLICATIONS

"82C37A Device Characteristics", Website : http://support-.intel.com/support/controllers/peripheral/8260.htm, (1998).

ls"82C37A–5 CHMOS High Performance Programmable DMA Controller", *Intel Spec Cover Sheet*.
"PCI Brochure", Revision 2.01, 37–49.

*Primary Examiner*—Glenn A. Auve
*Assistant Examiner*—Tim Vo
*Attorney, Agent, or Firm*—Schwegman, Lundberg, Woessner & Kluth, P.A.; Anthony Claiborne

[57] ABSTRACT

A data transfer system that relieves the central processing unit of a personal computer of the burden of controlling data transfers between mass storage devices coupled to a single device controller without utilizing main memory and which also increases the speed of such transfers. The data transfer system works with a computer having a DMA chip by causing the data to be stored in a transfer buffer instead of main memory when the device controller transfers data between the mass storage devices. The data transfer system also enables a data mirroring system for a personal computer by writing the data to the transfer buffer and also to a third mass storage device acting as a backup device. Another aspect of the data transfer system operates in computers having a local bus that couples peripherals to a central processing unit/main memory subsystem through a system controller. Data transfer logic executes in the system controller to decouple the central processing unit/main memory subsystem from the local bus while the data is transferred between the first and second mass storage devices under the control of the device controller.

12 Claims, 10 Drawing Sheets

FAST IDE DRIVE TO DRIVE TRANSFERS

FIELD OF THE INVENTION

The present invention is related to personal computers and in particular to transferring data between IDE (integrated device electronics) devices.

BACKGROUND OF THE INVENTION

IDE (integrated device electronics) controllers for mass storage devices are in common use in personal computers because they are easily configured and have fast access and transfer times. However, currently all transfers from one IDE device in a computer to another IDE device in the same computer require the data be read from the source device, written to the main memory of the computer, then read from the main memory, and finally written to the destination device. In order to access main memory, the IDE controller must interface to either the central processing unit (CPU) of the computer or to a direct memory access (DMA) chip which performs the actual writes and reads to and from main memory. Using the DMA chip permits the CPU to perform processor-intensive tasks in parallel with the data transfer. While a data transfer is taking place, the DMA chip acts as a gateway to main memory to prevent multiple processes from using the same portion of memory simultaneously.

Using main memory as a temporary storage buffer for the data allows re-writing the data to the destination disk without having to re-read the data from the originating disk if the initial write fails. However, memory is often a scarce resource in many computer systems, and the DMA transfer uses memory needed by other executing programs thus creating memory contention problems.

Therefore, the fast transference of data between IDE devices without using main memory is a currently unmet need in the computer user community.

SUMMARY OF THE INVENTION

A data transfer system that transfers data between two mass storage devices is embodied in a personal computer that has central processing circuitry and input/output circuitry commonly found in standard microprocessors used as central processing units (CPU), and also has a main memory access controller, such as a dynamic memory access (DMA) chip, that controls access to main memory. First and second mass storage devices having IDE (integrated device electronics) characteristics, such as hard disks, tape drives, or CD-ROMs, are coupled to a device controller. The device controller is further coupled to the main memory access controller which buffers the transferred data in the main memory. When the device controller transfers data between the mass storage devices, data transfer logic executes in the input/output circuitry to buffer the data in a transfer buffer outside of main memory. The transfer buffer may physically be located in the device controller and may vary in size. Transfer buffer sizes of two bytes and of a storage device sector are disclosed.

The data transfer system is also used as a data mirroring system for the personal computer, where a third device with IDE characteristics acts as a backup storage device when transferring data between the first and second mass storage devices. The data transfer logic writes the data to the transfer buffer as described above and also writes the data to the backup device.

The data transfer logic detects when a data transfer is between the mass storage devices and enables the transfer buffer. The data transfer logic then captures each memory-write signal generated by the main memory access circuitry and writes the data to the transfer buffer instead of main memory. After the write is complete, the data transfer logic captures each memory-read signal generated by the main memory access circuitry and reads the data from the transfer buffer instead of main memory. Furthermore, the data transfer logic generates a pseudo-memory-ready signal to notify the main memory access circuitry that the step of writing the data has completed.

The present invention also increases the speed of data transfers between devices having IDE characteristics in a computer having a local, or primary peripheral, bus coupling peripherals to a central processing unit/main memory subsystem through a system controller. In this architecture, the device controller is coupled to the primary peripheral bus as well as to the first and second mass storage devices. Data transfer logic executes in the system controller to decouple the central processing unit/main memory subsystem from the primary peripheral bus while the data is transferred between the first and second mass storage devices. The data is transferred on the primary peripheral bus under the control of the device controller.

Thus the data transfer system relieves the CPU of the burden of controlling data transfers between devices having IDE characteristics and does not utilize main memory. In one embodiment, the CPU continues working with data in its internal cache, while in an alternate embodiment, the CPU has access to data stored in main memory as well. Both embodiments conserve CPU cycles for compute-intensive processes while off-loading the trivial process of data transfer to other system components.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures. Signals and connections may be referred to by the same reference number or label, and the actual meaning will be clear from its use in the context of the description.

Direct Memory Access Embodiments

Figure 1:
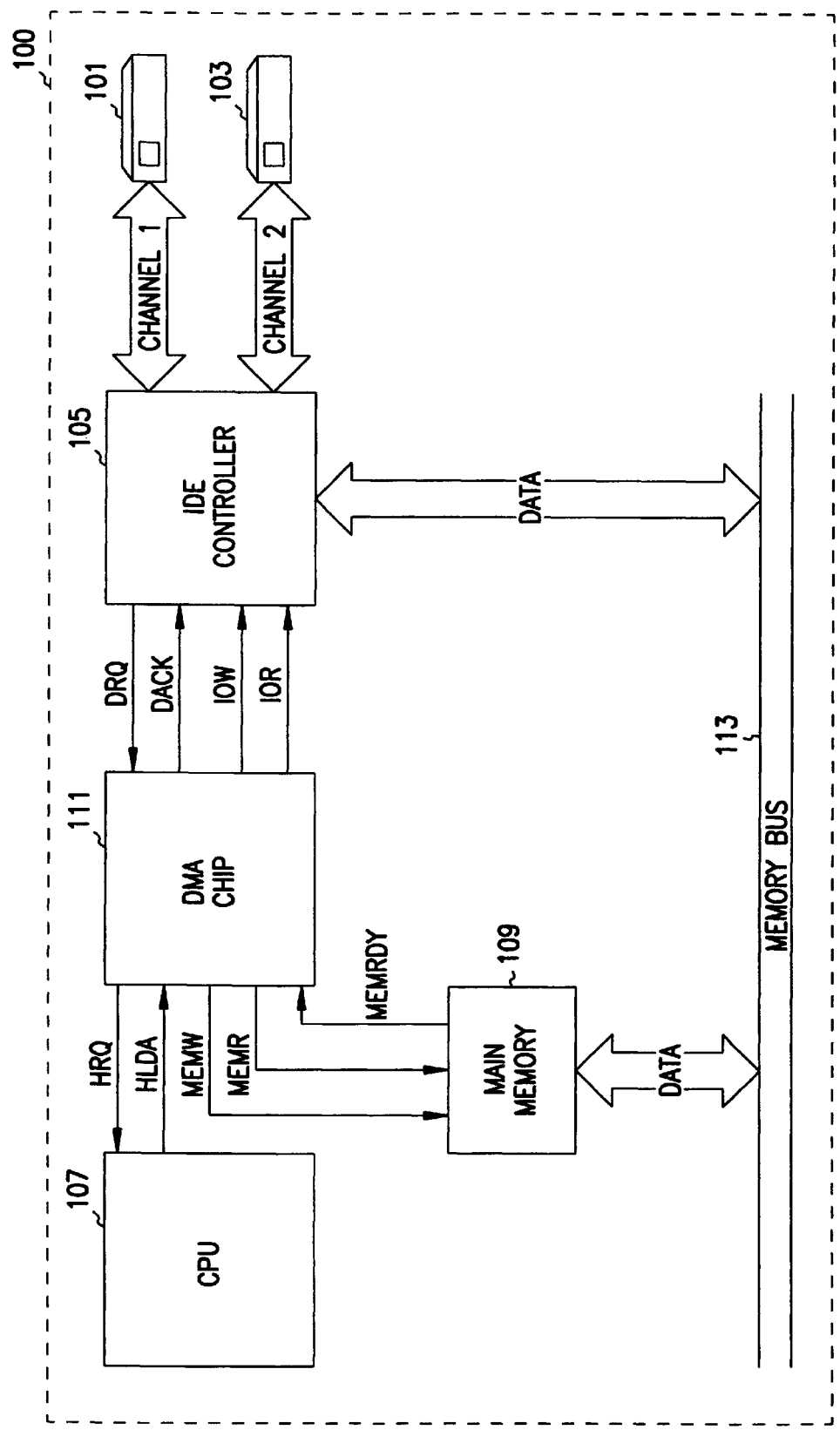
FIG. 1 is a block diagram of a prior art implementation of a DMA chip in a computer having two peripheral devices

A common prior art implementation for a personal computer 100 with a central processing unit (CPU) 107, a direct memory access (DMA) chip 111 and two IDE (integrated device electronics) devices 101 and 103 is shown in FIG. 1. IDE mass storage devices, such as hard disk drives, are commonly used in personal computers because they are easily configured and have fast access and transfer times. IDE hard disk drives 101 and 103 are interfaced to the computer by an IDE device controller 105 on the computer's motherboard. A standard IDE device controller supports up to four IDE devices on two data channels. Devices on different IDE data channels can work in parallel as the data streams are separate.

When software executing in the CPU 107 requests data stored on the IDE disk drive 101 or 103, the data is read into the computer's main memory 109 for manipulation. Similarly data in main memory 109 is frequently stored onto IDE disk drive 101 or 103 for later use. Software can also require the data to be read from IDE disk 101 and written to IDE disk 103, as in the instance of backup software, but the data is still temporarily written into memory between the time it is read from a source peripheral, disk 101, and written to a destination peripheral, disk 103. Because the CPU 107 controls the main memory 109 and disk 101 and 103, the CPU 107 must handle all these basic data transfers unless the drives support DMA transfers and are coupled to the DMA chip 111, as in FIG. 1. DMA transfers are controlled by the DMA chip 111 which accesses main memory 109 without requiring the intervention of the CPU 107. In order to avoid data corruption, only one operation at a time is allowed to access main memory 109 through a memory bus 113, so the CPU 107 cannot execute any I/O commands while a DMA transfer is in process but is free to perform processor-intensive work.

Figure 2:
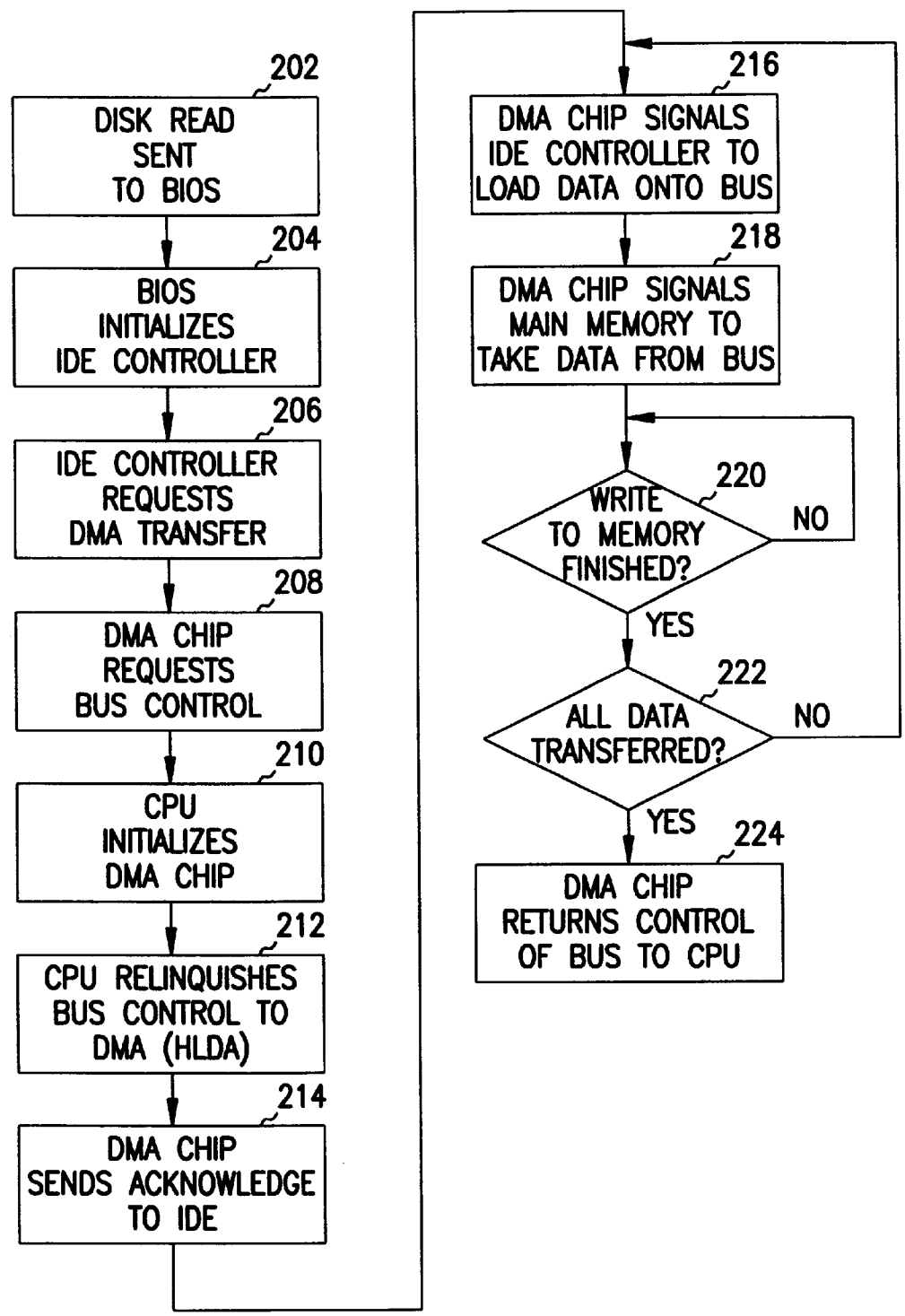
FIG. 2 is a logic flow diagram showing a DMA read cycle as implemented in the prior art.

A DMA read cycle in the prior art follows the basic logic set forth in FIG. 2. The CPU 107 responds to a software command to read data from a peripheral, such as IDE disk 101, by issuing a corresponding command to a firmware program called the BIOS (basic input/output system) which translates the software command into hardware data signals understood by the IDE device controller 105 (block 202). The BIOS initializes the IDE device controller 105 with the designation of the disk, 101 or 103, to read from, and a starting address for, and the amount of, data to be transferred (block 204). The IDE device controller 105 then sends a signal (DREQ) to the DMA chip 111 to request a DMA transfer (block 206). Because the DMA chip 111 requires exclusive use of the memory bus 113 during the transfer, the DMA chip 111 requests control of the bus 113 (HRQ) from the CPU 107 at block 208. The CPU 107 programs the DMA chip 111 with the location in main memory 109 into which the DMA chip 111 is allowed to write the data (block 210) and then relinquishes control of the bus 113 (HLDA) to the DMA chip 111 at block 212. The DMA 109 chip acknowledges the IDE device controller's request ($\overline{DACK}$) at block 214 and signals the controller 105 to read data from the source drive, 101 or 103, and load it onto the memory bus 113 ($\overline{IOR}$) at block 216. The DMA chip 111 then issues a write command ($\overline{MEMW}$) to main memory 109 which takes the data off the bus 113 and writes it into the memory area allocated by the CPU 107 for DMA's use (block 218). When the write to memory is complete, main memory 109 signals (MEMRDY) the DMA chip 111 at block 220.

Figure 3:
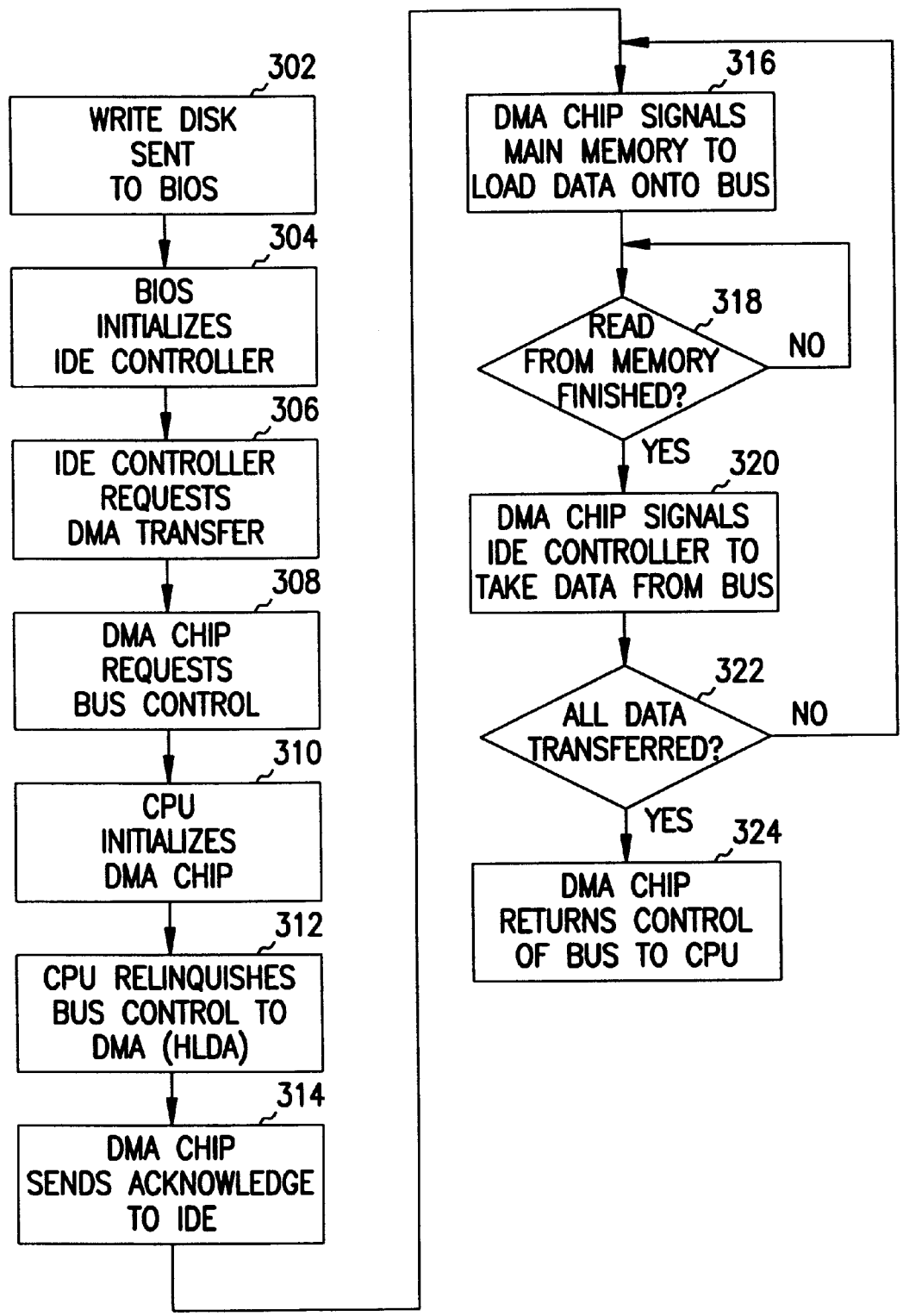
FIG. 3 is a logic flow diagram showing of a DMA write cycle as implemented in the prior art.

The DMA chip 111 keeps track of the number of read cycles required by decrementing a Terminal Counter (TC) representing the number of units of data to be transferred (block 222) and if the transfer is not complete, the DMA chip 111 issues another $\overline{IOR}$ signal to the IDE device controller 105 to read the next unit of data (block 216). The read cycle continues executing blocks 216, 218, 220 and 222 until all the data has been transferred into main memory 109. At that point, the DMA chip 111 relinquishes control of the memory bus 113 back to the CPU 107 (block 224) which can now manipulate the data as necessary. When the CPU 107 has finished working with the data, it institutes a write process to have the data written back to disk 101 or 103 as shown in prior art FIG. 3.

The CPU 107 responds to a software command to write the data from disk 101 or 103 write command to the BIOS. As above, the BIOS translates the software command into hardware data signals understood by the IDE device controller 105 (block 302). The BIOS initializes the IDE device controller 105 with the designation of the disk, 101 or 103, to write to, and a starting address for, and the amount of, data to be transferred (block 304). The IDE device controller 105 then sends the DREQ signal to the DMA chip 111 (block 306) which again requests control of the bus 113 (HRQ) from the CPU 107 (block 308). The CPU 107 programs the DMA chip 111 with the location in main memory 109 from which the DMA chip 111 will read the data (block 310) and then relinquishes control of the bus 113 (HLDA) to the DMA chip 111 at block 312. The DMA 109 chip acknowledges the IDE device controller's request ($\overline{DACK}$) at block 314 and then issues a read command ($\overline{MEMR}$) to main memory 109, which loads the data in memory onto the memory bus 113 ($\overline{IOW}$) at block 316. When the read from memory is complete, main memory 109 signals (MEMRDY) the DMA chip 111 at block 318 which causes the DMA chip 111 to signal the controller 105 to read the data from the memory bus 113 and write it to the disk 101 or 103 (block 320). As in the read cycle described above, the DMA chip 111 keeps track of the number of write cycles required by decrementing TC (block 322) and if the transfer is not complete, the DMA chip 111 issues another $\overline{IOW}$ signal to the IDE device controller 105 to read the next unit of data (block 316). The read cycle continues executing blocks 316, 318, 320 and 322 until all the data has been transferred onto disk 101 or 103. At that point, the DMA chip 111 relinquishes control of the memory bus 113 back to the CPU 107 (block 324).

Figure 4:
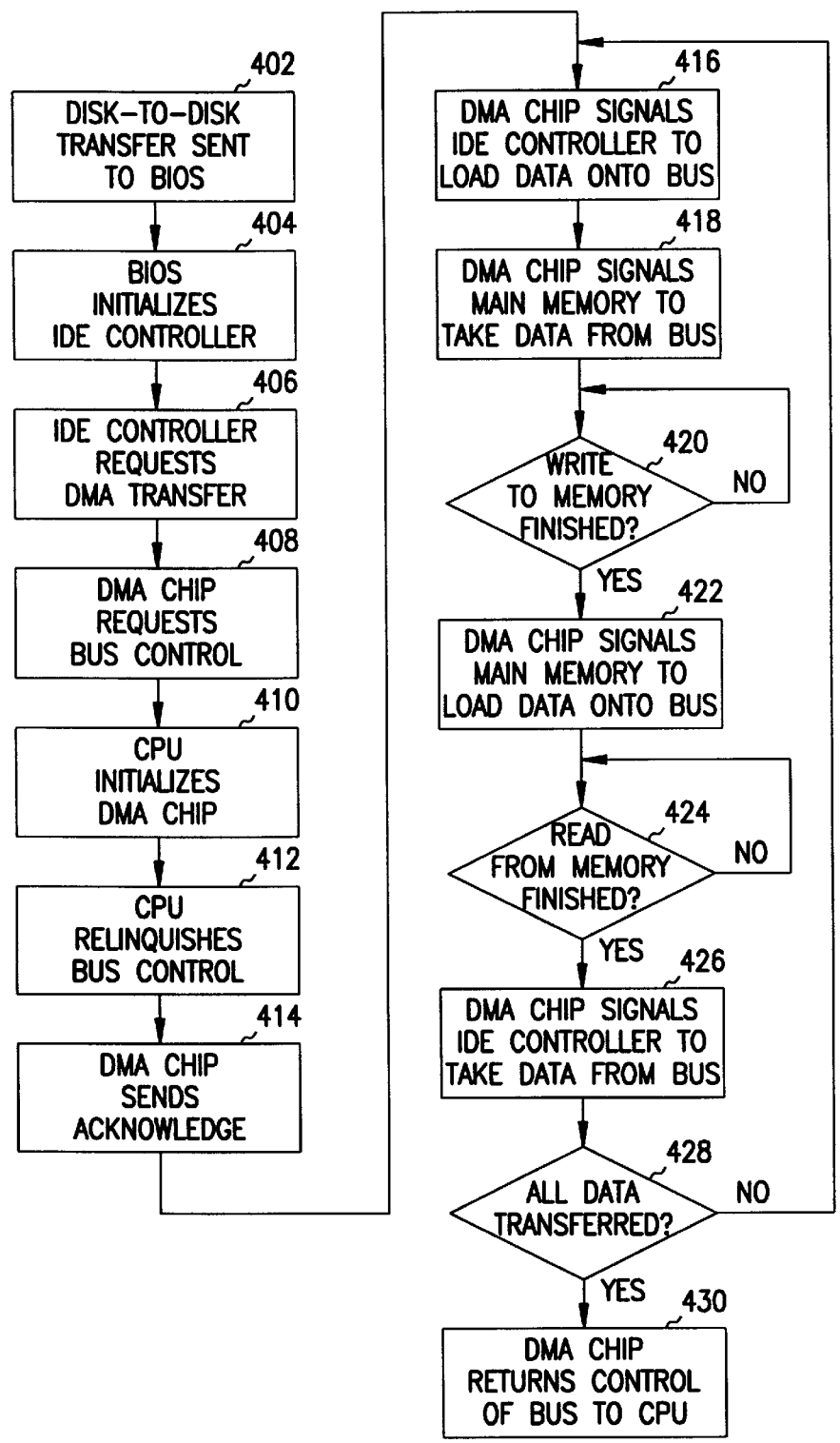
FIG. 4 is a logic flow diagram showing interleaving of the DMA read and write cycles in the prior art.

When the command is a drive-to-drive transfer of data between devices controlled by the same IDE device controller, the read and write cycles in the prior art are executed using slightly different logic, as shown in FIG. 4. Such a drive/controller configuration is illustrated by disks 101 and 103 in FIG. 1. The logic begins with the command to transfer data between disks 101 and 103 at block 402. As before, the BIOS passes parameters to the IDE device controller 105 but in this instance the parameters include both source and destination disk designations (block 404). The DMA transfer then acquires bus control (blocks 406, 408, 410, 412 and 414) as explained above in conjunction with the corresponding blocks in FIG. 2. After acquiring bus control, the DMA chip reads data from the source IDE 101 disk and writes it into main memory 109 (blocks 416, 418, 420) also as explained above in conjunction with the corresponding blocks in FIG. 2.

However, when the drives 101 and 103 are connected to the IDE device controller 105 on separate channels as shown in FIG. 1, the DMA chip 111 begins transferring the data from main memory 109 to the destination IDE disk 103 after the first unit of data has been read from the source drive 101 and written into main memory 109, i.e., the $\overline{\text{MEMR}}$ signal "chases" the $\overline{\text{MEMW}}$ signal through the area of main memory 109 designated for the DMA transfer (blocks 422, 424, and 426). The same counter in the DMA chip 111 is used to control both the read and the write cycles (block 430).

Figure 5A:
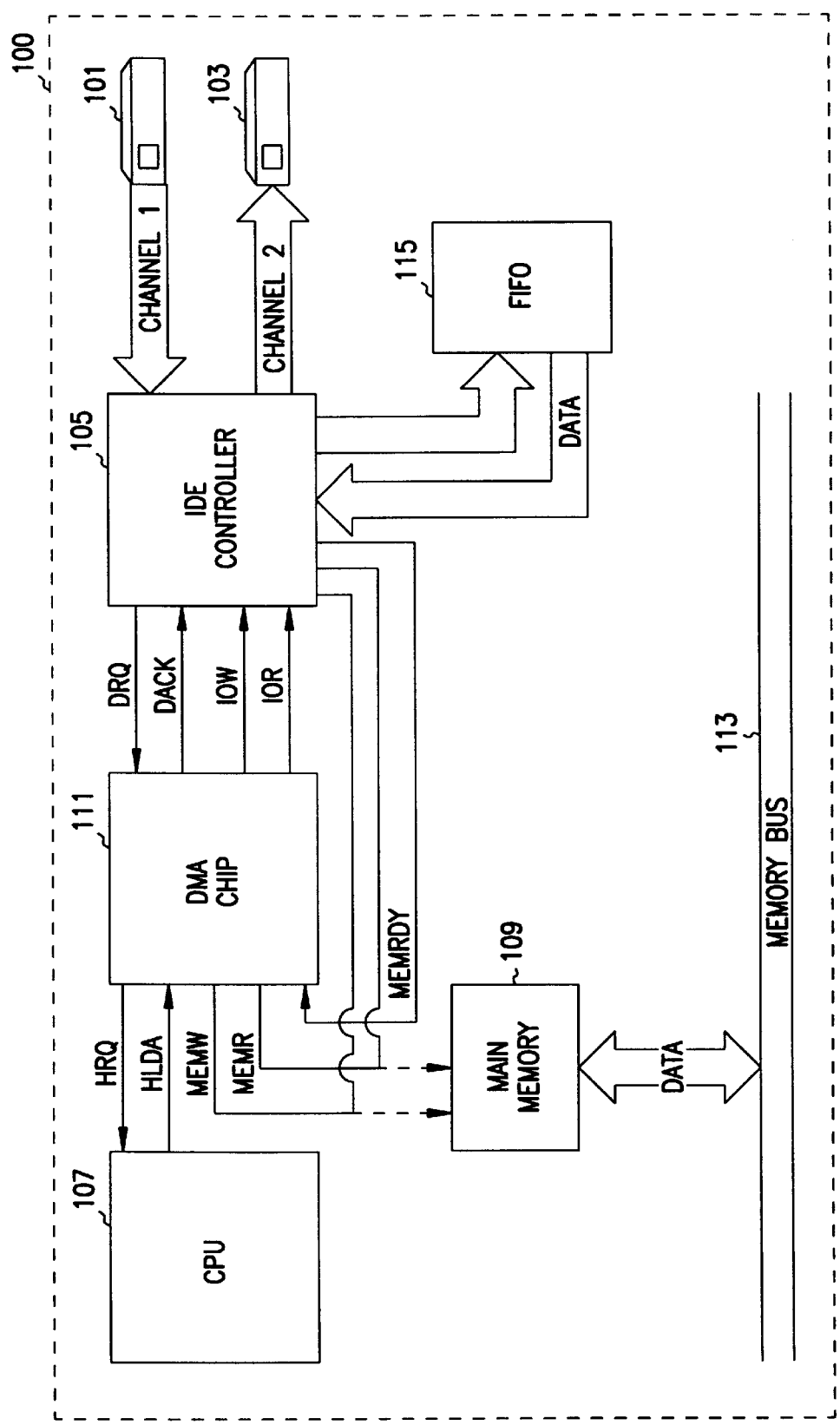
FIG. 5A is a block diagram of an embodiment of the invention in a computer having two IDE mass storage devices.

Turning now to the invention, FIG. 5A shows one exemplary embodiment implemented in a standard computer. In this embodiment, the IDE device controller 105 is coupled to the signal lines ($\overline{\text{MEMR}}$, $\overline{\text{MEMW}}$, and MEMRDY) between the DMA chip 111 and main memory 109 so that the IDE device controller 105 can block the signals and substitute its own during a drive-to-drive transfer operation. The embodiment shown in FIG. 5A also adds a FIFO (first-in-first-out) transfer buffer 115 which is coupled into the data lines leading from the IDE device controller 105 and the memory bus 113 so that the data being transferred is temporarily stored in the FIFO instead of main memory 109. The transfer buffer size varies depending on the characteristics of the devices, as will be readily apparent to those skilled in the art. In one embodiment, the transfer buffer size is two bytes. In an alternate embodiment, the transfer size is the sector size of the storage device. The embodiments illustrated in FIG. 5A use the TC in the DMA chip 111 to determine when the transfer is completed as is further illustrated in the logic flow shown in FIG. 6.

Figure 6:
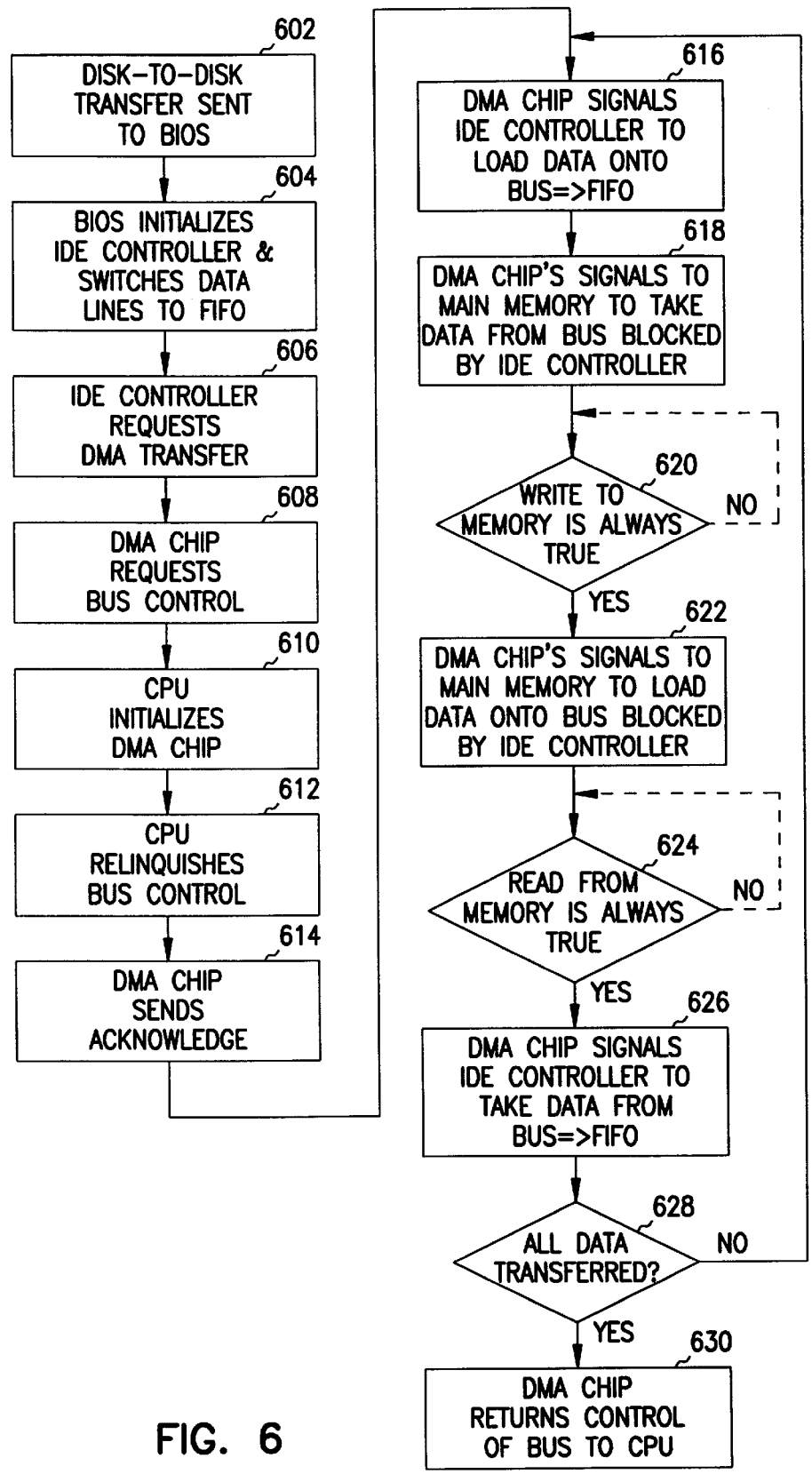
FIG. 6 is a logic flow diagram showing the interleaving of the DMA read and write cycles in accordance with the invention.

FIG. 6 illustrates the logic that executes in the BIOS and the IDE device controller 105 during a drive-to-drive transfer. A special BIOS subroutine is executed when the CPU 107 initiates a drive-to-drive data transfer (block 602). This subroutine instructs the IDE device controller 105 to switch its data lines from the memory bus 113 to the FIFO 115 (block 604). The logic represented by blocks 606 to 614 is the same as that in a normal DMA drive-to-drive transfer as shown, and explained above in conjunction with, FIG. 4. However, at block 616, the IDE device controller 105 loads the data from the drive into the FIFO 115 instead of main memory 109 in response to the $\overline{\text{IOR}}$ signal because the data lines have been switched by the BIOS. Next, the IDE device controller 105 blocks the write signal ($\overline{\text{MEMW}}$) sent from the DMA chip 111 from reaching main memory 109 (block 618) and sends a pseudo-MEMRDY signal back to the DMA chip 111 (block 620). Since the DMA chip 111 believes the memory write is complete, it signals ($\overline{\text{MEMR}}$) main memory 109 to load the data onto the memory bus 113 so it can be transferred to the destination disk (block 622). However, the IDE device controller 105 also blocks the $\overline{\text{MEMR}}$ signal (block 622) and sends another pseudo-MEMRDY signal back to the DMA chip 111 (block 624). The DMA chip 111, interpreting the pseudo-MEMRDY signal to mean the data has been loaded on the memory bus 113, signals ($\overline{\text{IOW}}$) the IDE device controller 105 to take the data from the bus 113 and write it to the destination drive at block 626. Since the data lines for the IDE device controller 105 have been switched to the FIFO 115, the data is read from the FIFO 115 instead of main memory 109 (block 626). Next the DMA chip 111 decrements its cycle counter at block 628, and signals the IDE device controller 105 to read the next unit of data from the source drive if the full transfer is not complete (block 616).

Figure 5B:
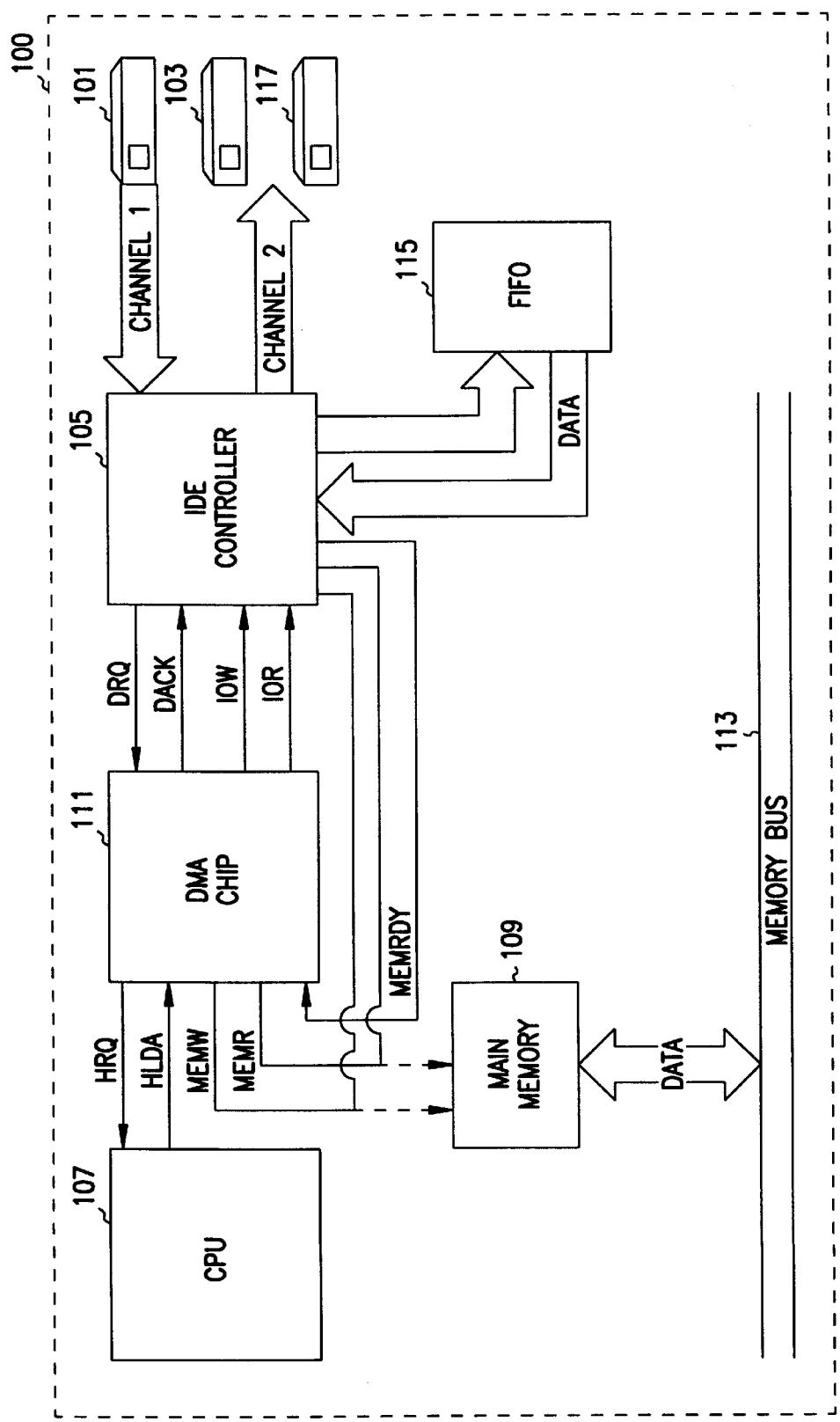
FIG. 5B is a block diagram of an embodiment of the invention in a computer having three IDE mass storage devices.

The embodiment shown in FIG. 5B adds a third IDE mass storage device, generically shown as disk 117, on the same data channel as IDE disk 103. The IDE disk 117 acts as a backup device so that when the IDE device controller 105 writes the data from FIFO 115 to IDE disk 103, it also performs a second write to the backup disk 117. This embodiment provides a data mirroring system which provides redundancy capacity for the computer. As will be apparent to those skilled in the art, the backup device may be coupled to either of the data channels on the IDE device controller because the IDE device controller keeps track of which devices are to have data read from them and which are to have data written to them. It will also be apparent to those skilled in the art, that the backup IDE device can be a tape drive, a writable CD-ROM drive, an optical disk, or comparable storage media.

Local Bus Embodiments

Many personal computers connect peripherals with high transfer rate requirements such as video monitors and hard disks to a 32-bit local bus instead of the standard expansion bus. The bus architecture for a computer utilizing a local, or primary peripheral, bus is shown in FIG. 7.

Figure 7:
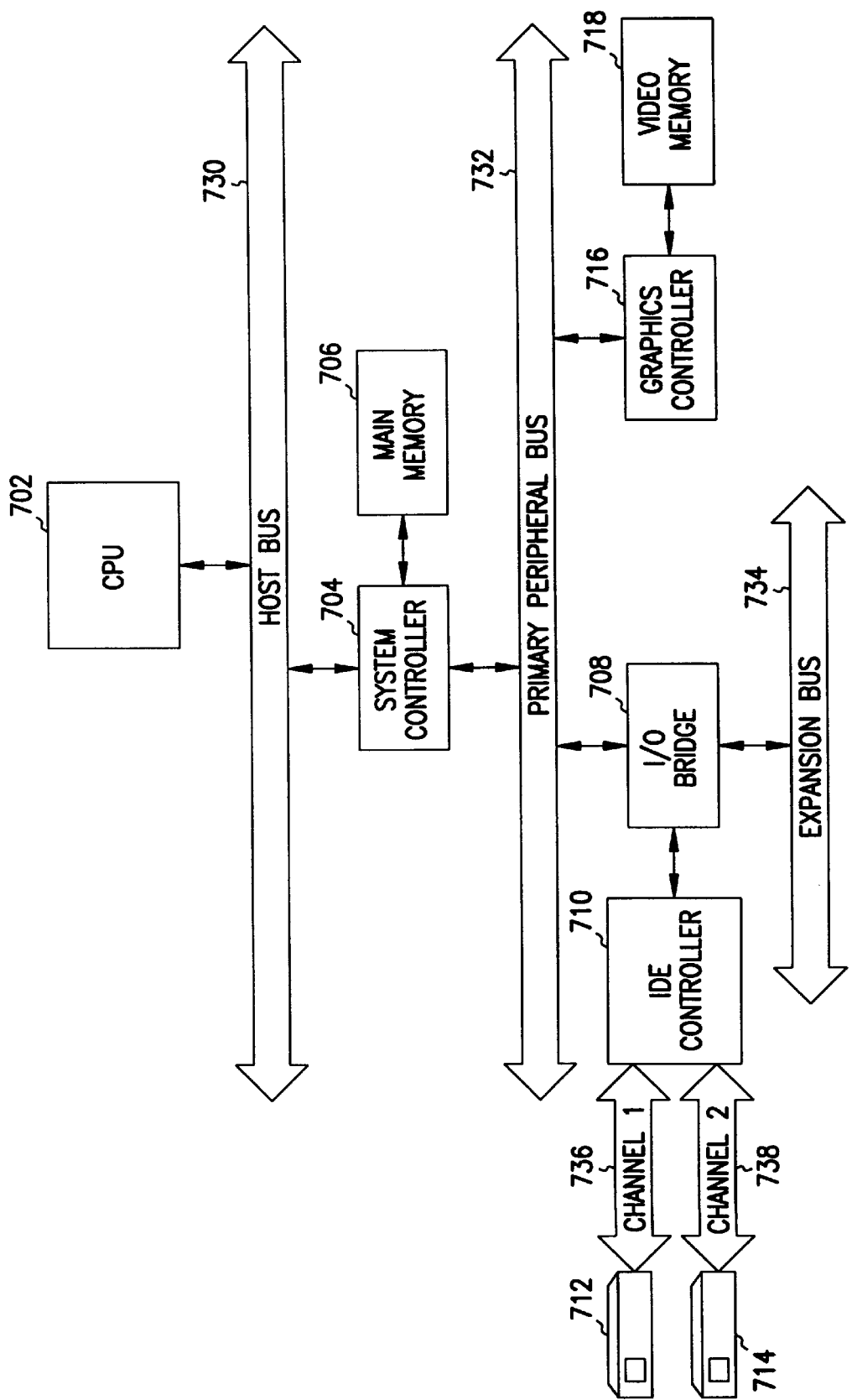
FIG. 7 is a block diagram of a computer system architecture utilizing a local bus to service peripherals.

The computer architecture in FIG. 7 includes a host bus 730 to service the CPU 702, and a system controller 704 to couple the host bus 730 to the primary peripheral bus 732. The system controller 704 also controls access to main memory 706. In one embodiment of the system architecture shown in FIG. 7, the primary peripheral bus 732 conforms to the protocols of the industry-standard peripheral component interconnect (PCI) bus and the system controller 704 is called a PCI bridge. An expansion bus 734 services system peripherals that do not require the high throughput rates afforded by the PCI bus 732. The industry standard architecture (ISA) bus is commonly the expansion bus 734 used in such a system architecture. The ISA bus 734 is coupled to the PCI bus 732 through an I/O bridge controller 708. Two IDE drives 712 and 714 are coupled through a PCI-compatible IDE device controller 710 which is further coupled to the PCI bus 732 through the I/O bridge 708. In addition, a graphics controller 716 is also coupled to the PCI bus 732. A DMA chip is not used in a PCI-bus architecture computer shown in FIG. 7.

The use of one bus to service the CPU/main memory subsystem and a separate bus to service the peripherals allows the CPU/main memory subsystem to operate in parallel with the peripherals as long as the CPU is not directly addressing a peripheral. This capability is often referred to as "decoupling" the CPU/main memory subsystem from the peripherals. In addition, the PCI bus supports a "bus mastering mode" common among primary peripheral bus architectures. Bus mastering allows a properly configured PCI device, such as the graphics controller 716, to take control of the PCI bus 732 and transfer data between itself and another PCI device without the necessity of using the CPU 702 to control the transfer. Bus arbitration logic designed to determine which device should receive control of the bus, and for how long, resides in one of the system components. In the embodiment shown in FIG. 7, the bus arbitration logic executes in the PCI bridge 704.

Figure 8:
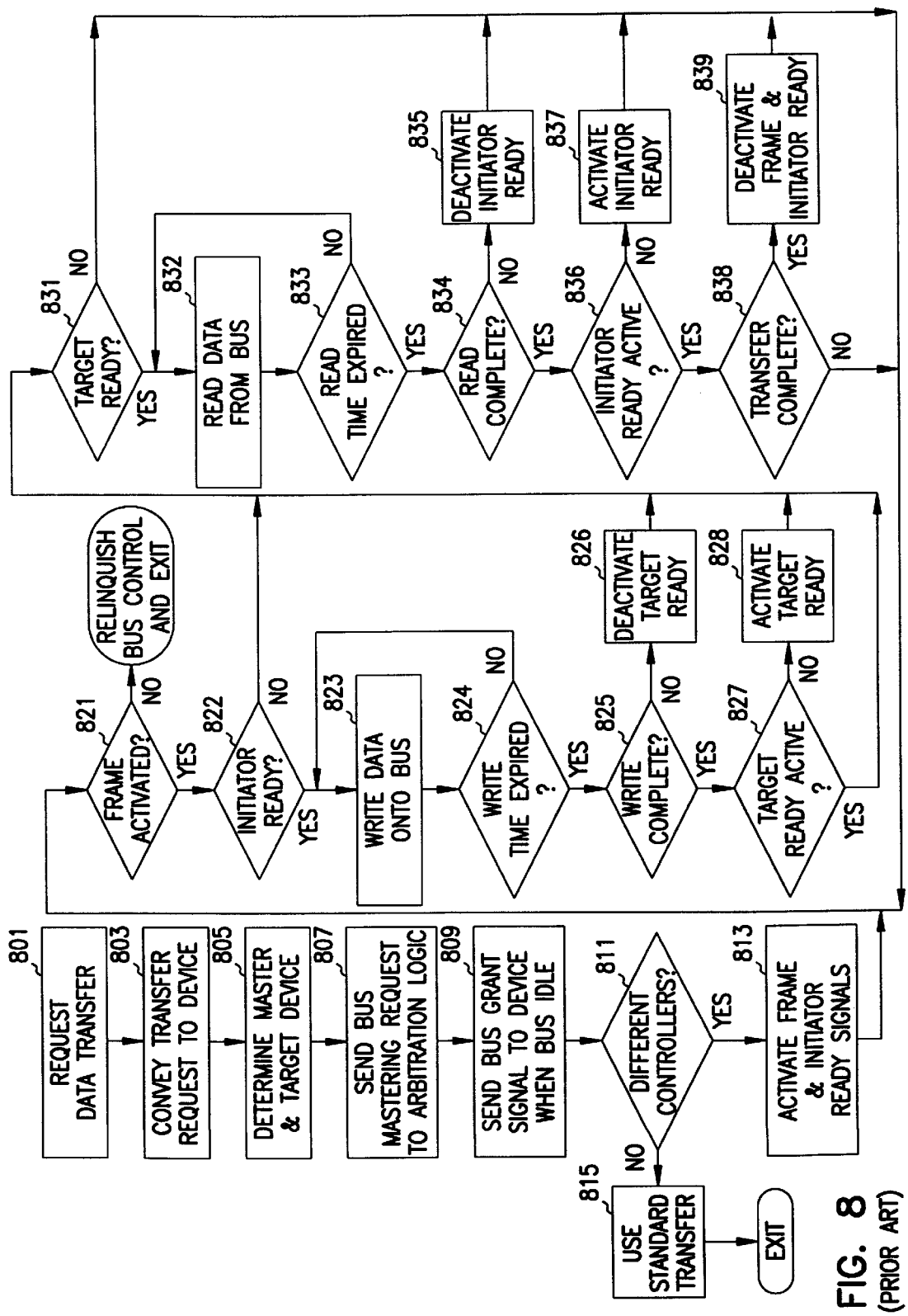
FIG. 8 is a logic flow diagram showing data transfers in a bus mastering system as common in the prior art.

Thus, using FIG. 7 as an example, the graphics controller 716 can request control of the PCI bus 732 to write data stored on one of the IDE disks 712 or 714 into video memory 718 attached to the graphics controller 716. FIG. 8 illustrates the logic flow of a bus mastering system in the prior art.

First an application executing in the CPU 702 executes a video display command (block 801) which generates a data transfer request to the graphics controller 716 at block 803. The graphics controller 716 determines that it will be the "initiator" or "bus master" device and that the IDE device controller 710 will be the "target" device at block 805. The graphics controller 716 generates a bus mastering request signal ($\overline{REQ}$) to the bus arbitration logic in the PCI bridge 704 at block 807. When the bus arbitration logic determines that the graphics controller 716 is allowed to use the PCI bus 732, the bus arbitration logic generates a grant signal ($\overline{GNT}$) at block 809. The grant signal notifies the graphics controller 716 that the bus 732 is ready. If the devices are controlled by different PCI controllers (block 811), the graphics controller 716 begins the transfer by activating a $\overline{FRAME}$ signal and an initiator ready signal ($\overline{IRDY}$) at block 813. When the IDE device controller 710 receives $\overline{IRDY}$ while the $\overline{FRAME}$ signal is active (blocks 821 and 822), it writes data from IDE disk 712 or 714 onto the bus 732 (block 823 and 824) during the first half of a clock cycle. The IDE device controller 710 notifies the graphics controller 716 that it has written the data by activating a target ready signal ($\overline{TRDY}$) at blocks 826 and 828. The graphics controller 716 reads the data from the bus 732 (blocks 831–833) and writes it into the video memory 718 during the second half of the same clock cycle. This sequence continues until the graphics controller 716 signals that the transfer is complete by deactivating $\overline{FRAME}$ and $\overline{IRDY}$ (blocks 838 and 839). The deactivation of $\overline{FRAME}$ and $\overline{IRDY}$ also notifies the bus arbitration logic that the graphics controller 716 is relinquishing control of the bus 723.

The two ready signals, $\overline{IRDY}$ and $\overline{TRDY}$, serve as a data flow control mechanism. Thus if the graphics controller 716 cannot transfer the data from the bus 732 to video memory 718 during the second half of a clock cycle (blocks 833 and 834), the graphics controller 716 deactivates $\overline{IRDY}$ at block 835 to prevent the IDE device controller 710 from reading new data onto the bus 732 (block 822). When the graphics controller 716 completes transferring the data from the bus 732 to video memory 718, it reactivates $\overline{IRDY}$ (blocks 836 and 837) and the IDE device controller 710 resumes reading data onto the bus 732. The $\overline{IRDY}$ and $\overline{TRDY}$ signals are also used to control the data flow when the IDE device controller cannot completely write the data onto the bus during the first half of a clock cycle (shown in blocks 824 through 826 in FIG. 8). Because the transfer process between the PCI devices is completely under the control of the graphics controller 716 as the bus master, the CPU 702 is decoupled from the PCI bus 732 and continues to execute instructions and use main memory 706 while the data is being transferred.

However, the prior art PCI bridge bus arbitration logic illustrated in FIG. 8 only works when two separate PCI devices are involved. Such prior art bus arbitration logic cannot be used to transfer data between two IDE drives 712 and 714 as shown in FIG. 7 because both drives are coupled to a single PCI device, the IDE device controller 710. Instead in this drive/controller configuration, the CPU 702 takes control of the transfer process and reverts to buffering drive-to-drive transfers in main memory (block 815), wasting valuable processor cycles and main memory space. The present invention overcomes this limitation when transferring data between IDE drives coupled to the same IDE device controller by modifying the bus arbitration logic to execute as shown in FIG. 9.

Figure 9:
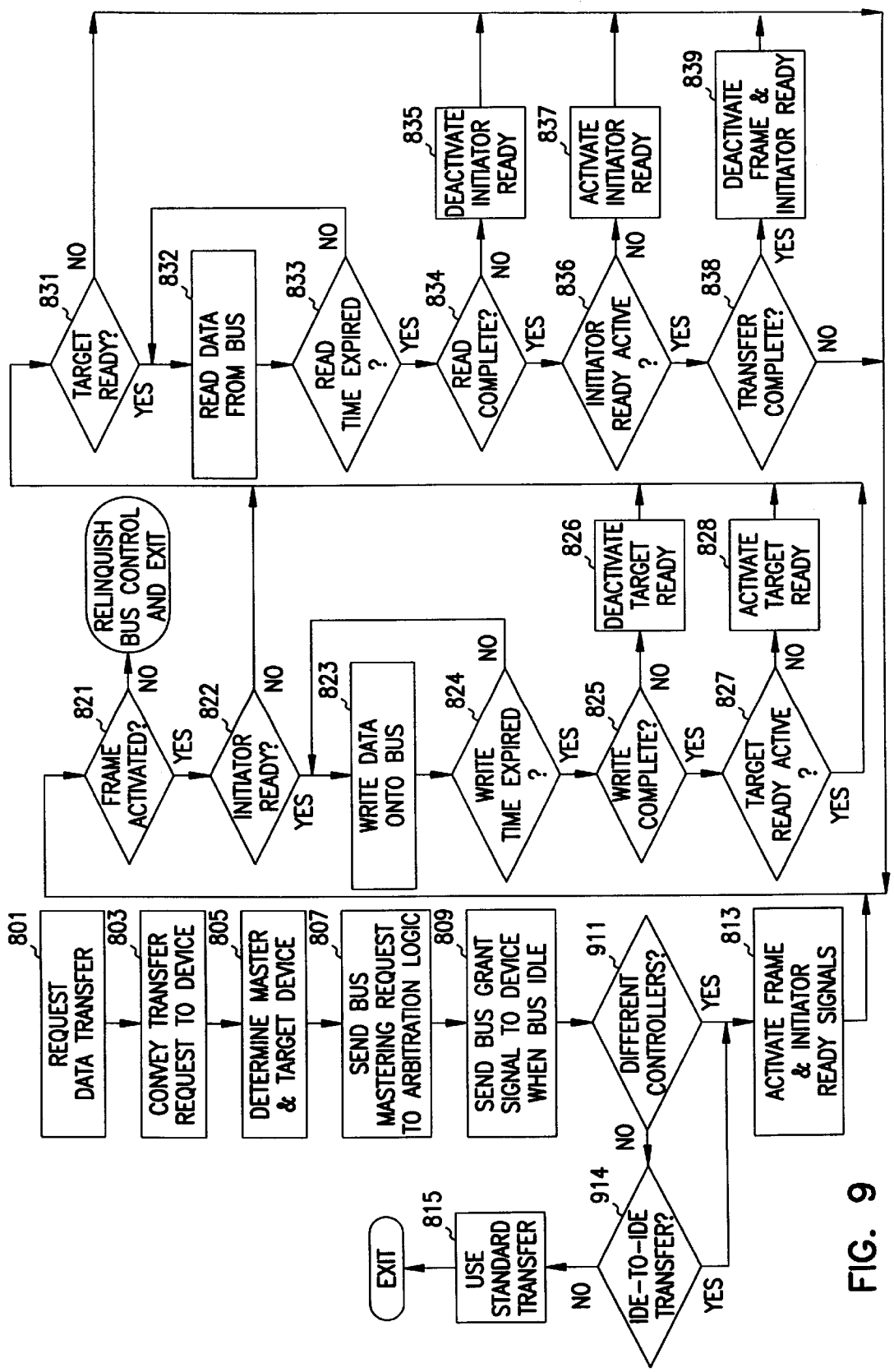
FIG. 9 is a logic flow diagram showing data transfers in one embodiment of the invention.

In the embodiment illustrated in FIG. 9, the initial steps proceed as described in conjunction with FIG. 8 through block 809. At block 911, if the initiator and target devices are not controlled by separate controllers, the new logic is invoked. At block 914, the new logic determines if the transfer is between IDE drives controlled by the same controller as are, for example, drives 712 and 714 in FIG. 7. If they are not, the CPU 702 takes control of the transfer process at block 815 as described above. However, if the transfer is between IDE drives configured as are drives 712 and 714, the new logic proceeds to block 813 to decouple the CPU 702 from the PCI bus 732 and to perform the remainder of the data transfer as discussed above in conjunction with FIG. 8. Thus, the CPU 702 continues to process instructions while the data transfer between the IDE devices 712 and 714 proceed under the control of the IDE controller 710.

The use of the data transfer system with other mass storage devices controlled by bus-mastering controllers will be apparent to those skilled in the art.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A data transfer system for a personal computer wherein the computer comprises central processing circuitry and input/output circuitry coupled to a main memory access controller which is further coupled to a main memory, the data transfer system comprising:

at least one device controller coupled to first and second mass storage devices having IDE (integrated device electronics) characteristics and further coupled to the main memory access controller; and data transfer logic executing in the input/output circuitry when the device controller transfers data between the first and second mass storage devices so that the device controller buffers the data read from one of the mass storage devices in a transfer buffer outside of main memory under the control of the main memory access controller for writing to the other of the mass storage devices.

2. The data transfer system of claim 1, wherein the transfer buffer is physically located in the device controller.

3. The data transfer system of claim 1, wherein the transfer buffer holds at least two bytes of data.

4. The data transfer system of claim 1, wherein the transfer buffer holds at least an amount of data equal to a storage device sector.

5. The data transfer system of claim 1, wherein the first and second mass storage devices are fixed hard disk drives.

6. The data transfer system of claim 1, wherein the first mass storage device is a fixed hard disk drive and the second mass storage device is a tape drive.

7. The data transfer system of claim 1, wherein the first mass storage device is a CD-ROM drive and the second mass storage device is a fixed hard disk drive.

8. A data mirroring system for a personal computer wherein the computer comprises central processing circuitry and input/output circuitry coupled to a main memory access controller which is further coupled to a main memory, the data mirroring system comprising:

at least one device controller coupled to first, second, and backup mass storage devices having IDE (integrated device electronics) characteristics and further coupled to the main memory access controller; and data transfer logic executing in the input/output circuitry when the device controller transfers data between the first and second mass storage devices so that the device controller buffers the data read from one of the mass storage devices in a transfer buffer outside of main memory for writing to the other of the mass storage devices and further writes the data to the backup mass storage device under the control of the main memory access controller.

9. A method of increasing the speed of data transfers between mass storage devices having IDE (integrated device electronics) characteristics, wherein the mass storage devices are components in a computer having a main memory controlled by main memory access circuitry, the method comprising the steps of:

detecting a data transfer between the mass storage devices;

enabling a transfer buffer outside of main memory;

capturing each memory-write signal generated by the main memory access circuitry and writing the data to the transfer buffer; and capturing each memory-read signal generated by the main memory access circuitry and reading the data from the transfer buffer instead of main memory.

10. The method of claim 9, further comprising the step of:

generating a pseudo-memory-ready signal to notify the main memory access circuitry that the step of writing the data has completed.

11. A method of increasing the speed of data transfers from a first to a second mass storage devices having IDE (integrated device electronics) characteristics and controlled by a device controller, wherein the mass storage devices are components in a computer having a primary peripheral bus coupled to the device controller and further coupled to a central processing unit/main memory subsystem, the method comprising the steps of:

detecting a data transfer from the first to the second mass storage device;

decoupling the central processing unit/main memory subsystem from the primary peripheral bus; and transferring the data from the first to the second mass storage device on the primary peripheral bus under the control of the device controller.

12. A data transfer system for a personal computer, wherein the computer comprises a primary peripheral bus coupled to a device controller and further coupled to a system controller which controls access to a central processing unit/main memory subsystem, the data transfer system comprising:

first and second mass storage devices having IDE (integrated device electronics) characteristics coupled to the device controller; and data transfer logic executing in the system controller so that the central processing unit/main memory subsystem is decoupled from the primary peripheral bus while the data is transferred between the first and second mass storage devices on the primary peripheral bus under the control of the device controller.

* * * * *